(12) United States Patent
Giannini et al.

(10) Patent No.: US 10,172,385 B2
(45) Date of Patent: Jan. 8, 2019

(54) DEVICE AND METHOD FOR DISCHARGING MATERIAL ON A MOVING SUBSTRATE

(71) Applicant: Montrade S.p.A., Bologna (IT)

(72) Inventors: Antonella Giannini, Bologna (IT); Alberto Monzoni, Bologna (IT)

(73) Assignee: MONTRADE S.P.A., Bologna (IT)

( * ) Notice: Subject to any disclaimer, the term of this patent is extended or adjusted under 35 U.S.C. 154(b) by 14 days.

(21) Appl. No.: 15/531,873

(22) PCT Filed: Dec. 1, 2015

(86) PCT No.: PCT/IB2015/059251
§ 371 (c)(1),
(2) Date: May 31, 2017

(87) PCT Pub. No.: WO2016/088039
PCT Pub. Date: Jun. 9, 2016

(65) Prior Publication Data
US 2017/0258127 A1    Sep. 14, 2017

(30) Foreign Application Priority Data
Dec. 2, 2014 (IT) .............................. TO2014A1004

(51) Int. Cl.
B65G 45/18 (2006.01)
A24D 3/02 (2006.01)
B65G 65/48 (2006.01)

(52) U.S. Cl.
CPC ......... *A24D 3/0216* (2013.01); *A24D 3/0225* (2013.01); *B65G 45/18* (2013.01); *B65G 65/4881* (2013.01); *B65G 2201/042* (2013.01)

(58) Field of Classification Search
CPC ................ A24D 3/0216; A24D 3/0225; B65G 65/4881; B65G 45/18; B65G 2201/042
See application file for complete search history.

(56) References Cited

U.S. PATENT DOCUMENTS 3,312,151 A    4/1967    Molins
3,550,508 A    12/1970   Wartman, Jr. et al.
(Continued)

FOREIGN PATENT DOCUMENTS

CN    104048715 A    9/2014
WO    2013/022360 A2    2/2013

OTHER PUBLICATIONS

Patent Cooperation Treaty, Notification of Transmittal of the International Search Report and the Written Opinion of the International Searching Authority, or the Declaration for PCT/IB2015/059251 dated Mar. 15, 2016, 11 pages.
(Continued)

*Primary Examiner* — Jason K Niesz
(74) *Attorney, Agent, or Firm* — Heslin Rothenberg Farley & Mesiti P.C.; Victor A. Cardona, Esq.

(57) ABSTRACT

A device for discharging particulate material, for example powder material, granules or capsules, or in general free-flowing material, such as adhesive material, on a substrate moving along a conveying direction, includes at least one drum rotor having at least one helical track carrying the material to be discharged. The drum rotor is arranged adjacent to the moving substrate, with its axis substantially parallel to the conveying direction so that the portion of the at least one helical track which is closest to the substrate moves in the conveying direction during rotation of the drum rotor and discharges the material carried thereby on the substrate.

14 Claims, 8 Drawing Sheets

(56) References Cited

U.S. PATENT DOCUMENTS

| | | | |
|---|---|---|---|
| 3,610,112 | A | 10/1971 | Labbe |
| 4,425,107 | A | 1/1984 | Hall |
| 5,875,824 | A | 3/1999 | Atwell et al. |
| 7,849,889 | B2 | 12/2010 | Smith et al. |
| 8,590,582 | B2 | 11/2013 | Jackels et al. |

OTHER PUBLICATIONS

Supplementary European Search Report for corresponding European Patent Application No. EP15835321 dated Aug. 30, 2018.

In a first solution, the drum rotor has a cylindrical wall interposed between an inner stator and an outer stator. At least one material feeding inlet is associated with the outer stator and at least a suction chamber is associated with the inner stator, which faces the inner surface of the drum rotor and communicates with a vacuum source, for favouring feeding of the material from said feeding inlet to said at least one helical channel. In the case of this solution, the wall of the drum rotor has a number of holes at the bottom of said at least one helical channel, for the passage of air towards said suction chamber.

According to a further preferred feature, at least one blowing chamber is associated with the inner stator, which faces the inner surface of the drum rotor and is oriented towards said substrate, for favouring discharge of the material on said substrate.

In a variant, said at least one helical track is constituted by a helical channel having a movable or deformable bottom wall and the inner stator is provided on one side facing towards said substrate with a device for pushing radially said movable or deformable wall, in order to favour discharge of the material outwardly on the substrate.

According to a preferred feature, the drum rotor has a plurality of helical tracks which are axially spaced from each other, for simultaneously discharging material on areas of the substrate which are longitudinally spaced from each other in the conveying direction.

In a typical application, the drum rotor is rotated at a speed synchronized with the speed of the moving substrate, so that the portion of each helical track which is adjacent to the substrate moves axially at a speed substantially corresponding to the speed of the moving substrate.

In an alternative embodiment, the above mentioned helical path is constituted by a helical rib carrying adhesive material to be applied on a substrate.

As already indicated, the present invention is of general applicability.

However a specific aspect of the invention relates to the application of the above indicated principles to the field of machines for production of filters for cigarettes or smoking articles in general.

In a variant of the invention, the device comprises a plurality of discontinuous helical tracks, each defined by a plurality of cavities distributed along a respective helical path. In an exemplary embodiment, within each of said cavities there is slidably mounted a piston movable between a retracted position, for receiving the particular material within this cavity, and an advanced position, for discharging the particulate material out of said cavity.

DESCRIPTION OF SOME EMBODIMENTS

Further features and advantages of the invention will become apparent from the description which follows with reference to the annexed drawings, given purely by way of non limiting example, in which:

FIGS. 1, 2, which have been already described in the foregoing, show two devices of the prior art.

Figure 1:
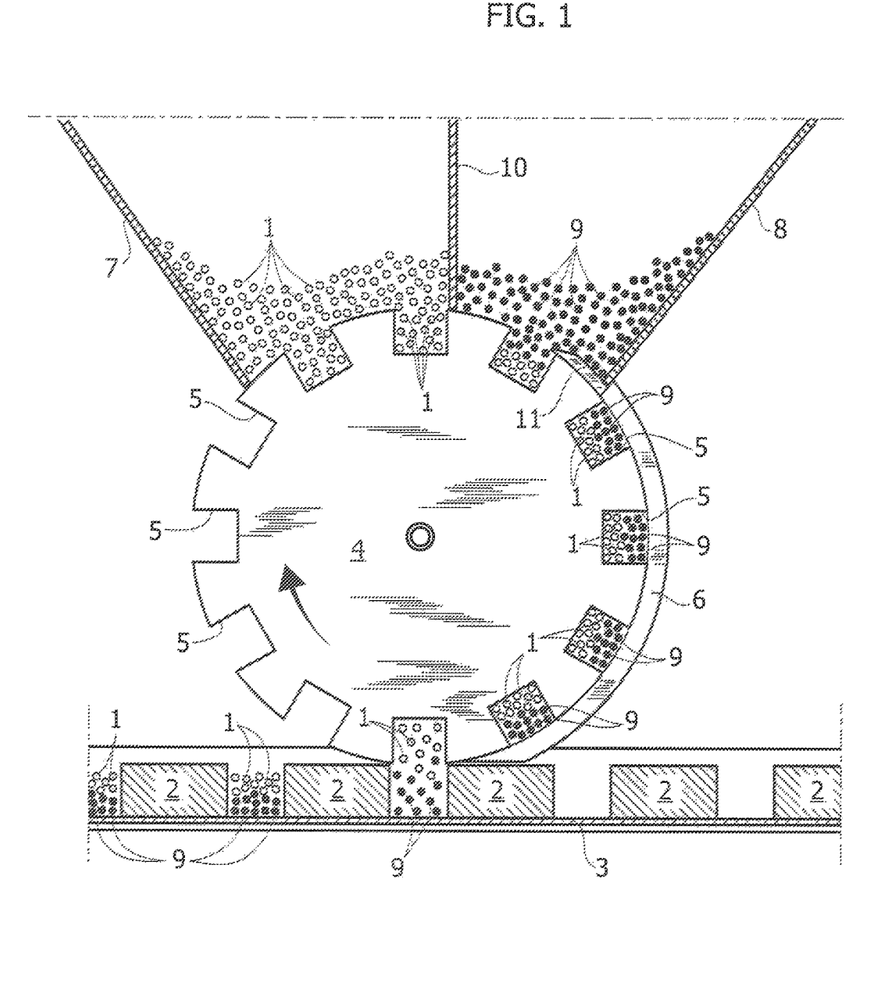
Figure 2:
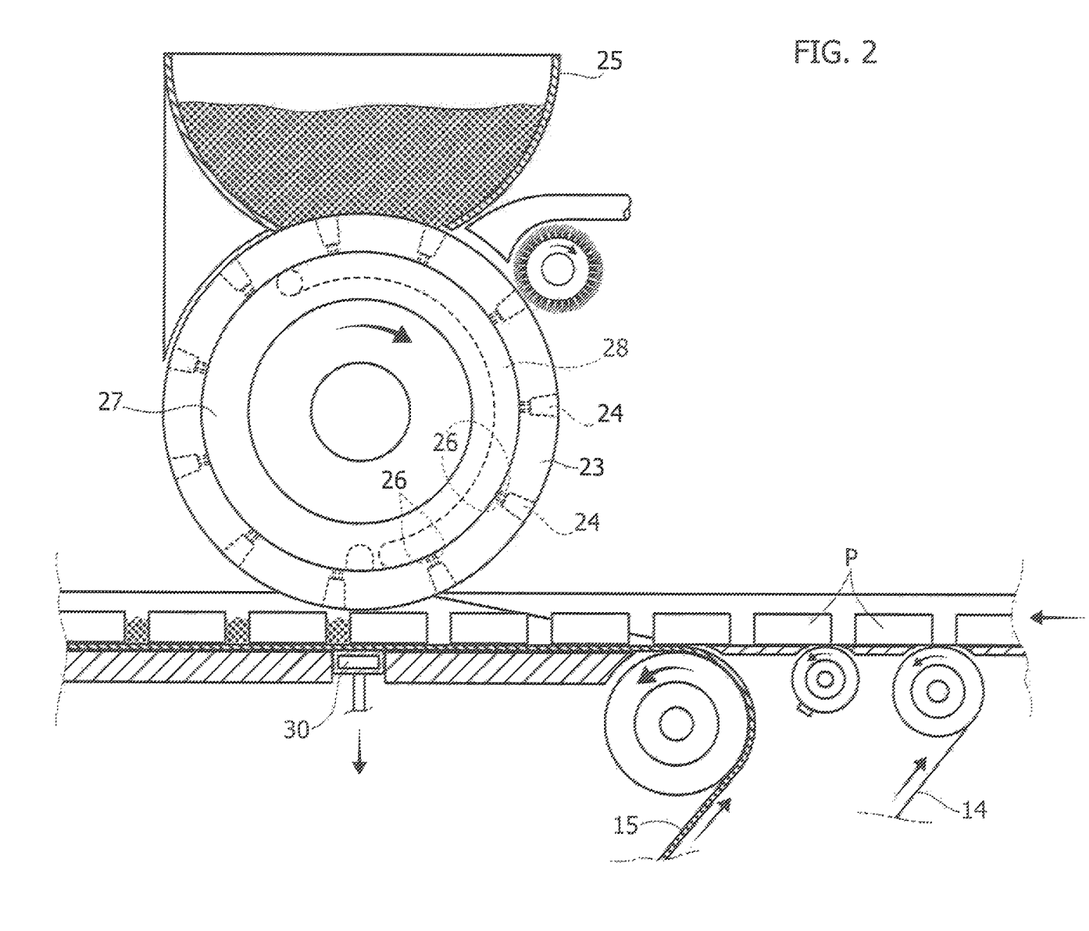
Figure 3:
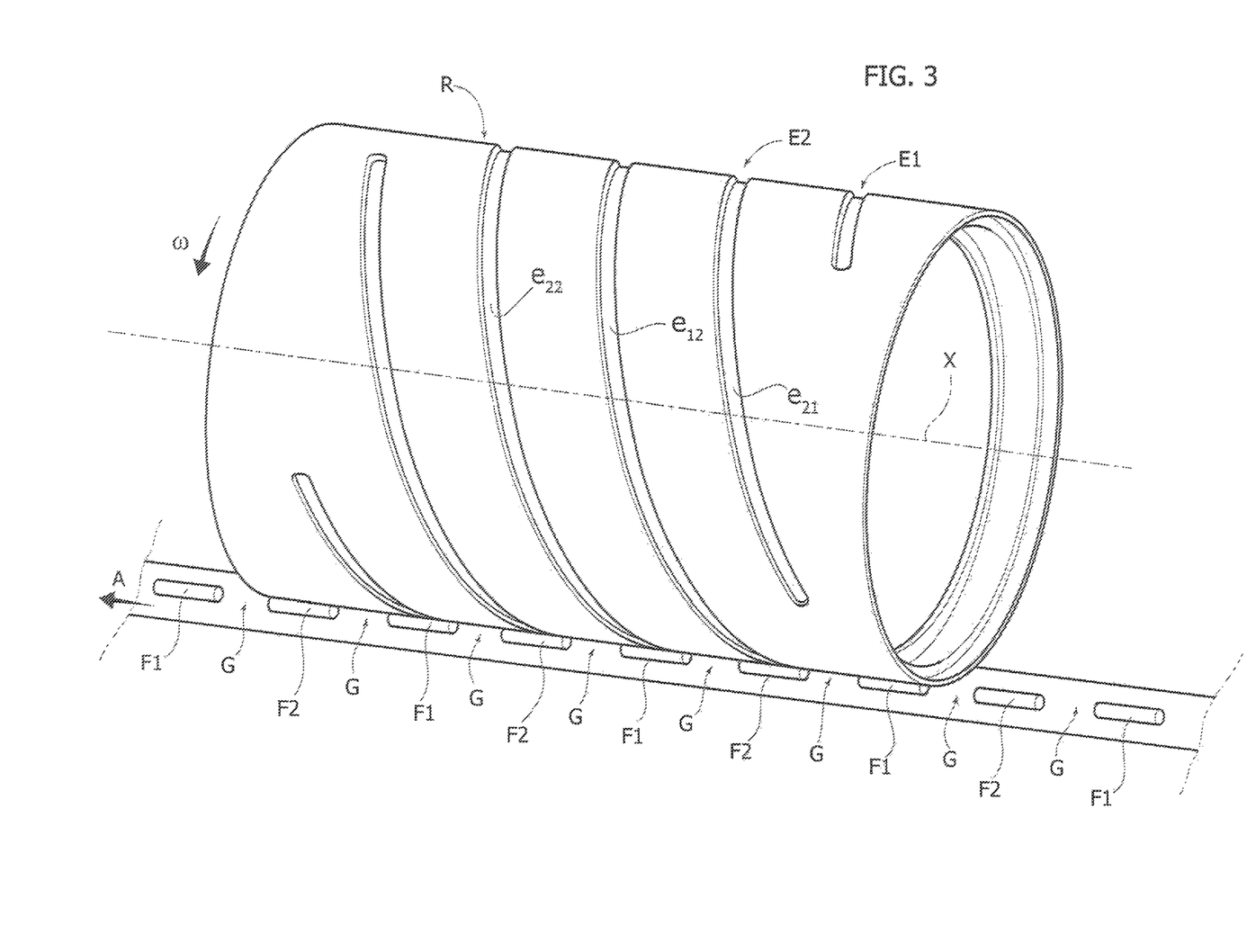
FIG. 3 is a diagrammatic perspective view which shows the principle which is at the basis of the present invention.

FIGS. 1, 2 have been described in the foregoing. FIG. 3 shows the principles which is at the bases of the present invention. In this figure, reference R generally designates a drum rotor which is arranged adjacent to a substrate S moving along a direction A. The example shown relates to the application to a machine for production of filters for cigarettes or smoking articles, in which the substrate is constituted by an aligned series of filter segments F1, F2 which are supported on a wrapping web W moving in direction A. The means for conveying the wrapping web W can be constituted by a conveyor belt, similarly to what has been described with reference to the known solutions of FIGS. 1, 2.

In the specific illustrated example, the filter segments F1, F2 which are arranged on the web W have different lengths. Each filter segment is spaced from the filter segment adjacent thereto, so as to define a gap G which is filled with particulate material, such as powder material, granules or capsules.

As shown in FIG. 3, the drum rotor R is arranged adjacent to the web W with its axis X parallel to the conveying direction A of the web. According to a basic feature of the present invention, the drum rotor R has at least one helical track carrying the material to be discharged. Preferably, there are provided many helical tracks which are axially spaced from each other. In FIG. 3, two helical tracks E1, E2 are shown, each having subsequent turns $e_{11}, e_{12}, \ldots$ ; $e_{21}, e_{22}, \ldots$, which extend throughout the entire axial dimension of rotor R. In an actual exemplary embodiment four helical tracks are provided, constituted by four helical channels formed in the outer surface of rotor R.

During rotation of rotor R, the particulate material contained within the helical channels E1, E2 is held within these channels, in the way which will became apparent in the following, until the material comes to be at the lower area of the rotor R adjacent to web W, where the material is discharged on the web.

The arrangement of channels E1, E2 on the rotor R and the position of these channels with respect to the sequence of filter segments F1, F2 is selected in such a way that the portion of each channel which is adjacent to the web W comes to be at a gap G between two adjacent filter segments. The speed of rotation of the drum rotor R is synchronized with the speed of advance of web W along direction A, so that the portion of each helical channel E1, E2 adjacent to the web tracks the respective gap G by moving at its same speed. Therefore, the operation for discharging the material into each gap G can be completed within the entire time interval taken by each gap G for going from one end to the other of the drum rotor R. Clearly, this ensures the possibility of carrying out the operation for discharging the material in an efficient and reliable way, without posing any strict limits to the maximum speed of movement of the web W, thereby providing a high productivity of the machine.

Figure 4:
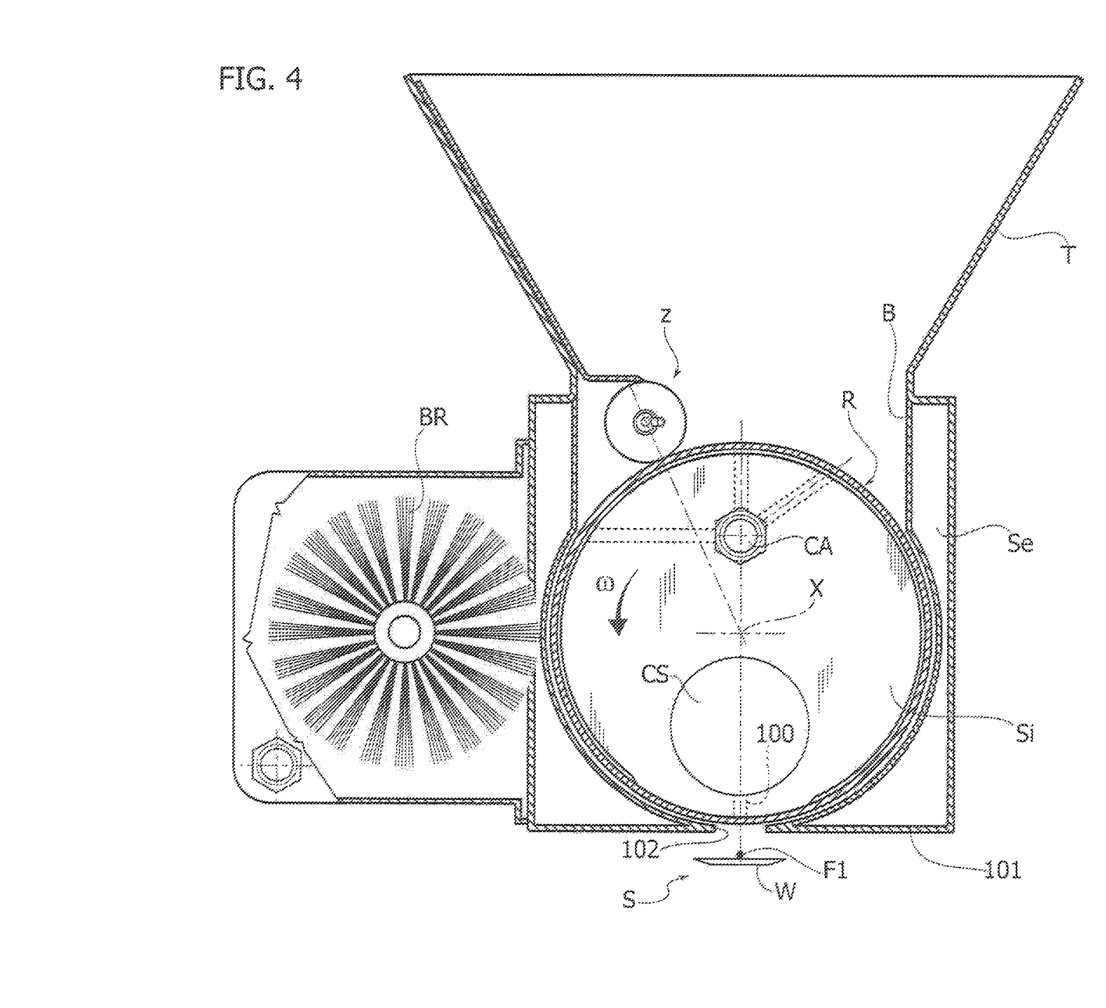
FIG. 4 is a cross-sectional diagrammatic view of an embodiment of the device according to the invention.

FIG. 4 shows an embodiment in which the tubular cylindrical wall of the drum rotor R is rotatably supported by an inner stator Si and an outer stator Se which defines a feeding inlet B. The feeding inlet B is located at the lower end of a feeding hopper T which is for receiving the particulate material which must be fed on web W.

A suction chamber CA is associated with the inner stator Si, which communicates with a vacuum source (not shown) and further communicates with a chamber defined between the outer surface of the inner stator Si and the inner surface of the drum rotor R.

As already indicated in the foregoing, the outer surface of the drum rotor R is formed with said plurality of helical channels E1, E2. The bottom wall of each channel is perforated, to enable passage of air towards the suction chamber CA. The suction effect favours and accelerates the step of charging the particulate material into channels E1, E2, while these channels come with their empty portions below hopper T.

Naturally, the provision of a suction system for accelerating the material charging step is preferred, but is not essential. This measure has the advantage of enabling the feeding inlet B to be provided not necessarily above rotor R, but alternatively on one side thereof, if this should be necessary.

In FIG. 4, as also in FIG. 3, the direction of rotation of the drum rotor R is indicated by arrow ω.

In the specific example shown in FIG. 4, at the inlet B there is provided a rotating roller Z for favouring a proper feeding of the material within the channels E1, E2.

Furthermore, at an area downstream of the feeding inlet B, with reference to the direction of rotation of rotor R, a rotating brush BR is provided, which is adapted to dose the material on the helical channels E1, E2 of the drum rotor R.

Again in the case of the preferred embodiment shown herein, a blowing chamber CS is associated with the inner stator Si which communicates with a source of pressure and has a communication channel 100 opening in front of the inner surface of the drum rotor R at the lower position of the roller, adjacent to web W. During operation, air blown from chamber CS flows through holes provided on the bottom wall of the helical channels E1, E2 thereby accelerating the discharging step of the material on web W.

Again with reference to FIG. 4, the outer stator Se has a lower wall 101 which separates the drum rotor R from substrate S and has a slot 102 extending in the longitudinal conveying direction A (FIG. 3) for passage of the discharged material.

The annexed drawings do not show the details of construction relating to the motors for actuating rotation of the drum rotor R and brush BR, which can be of any known type.

The operation of the above described device is as follows.

The wrapping web W carrying the aligned sequence of filter segments F1, F2, (FIG. 3) is moved in the conveying direction A, at a predetermined conveying speed. The drum rotor R provided adjacent to web W is rotated in direction ω at a speed synchronized with the conveying speed of the wrapping web, so that the portion of each helical channel E1, E2, etc. adjacent to the wrapping web W moves axially at a speed substantially corresponding to the conveying speed of web W.

Each helical channel E1, E2 receives particulate material from hopper T in the stage in which a portion thereof comes to be facing this hopper. The charging of the material into each channel is preferably favoured by the suction effect due to the suction chamber CA. The portions of the helical channels filled with particulate material coming from hopper T, with the continuing rotation around axis X, come to be at the roller brush Z, which removes excess material from the outer surface of the drum rotor R. As a result of the continued rotation around axis X, brush BR doses the material in channels E1, E2. At the area between brush BR and the material discharging position, the material is held within channels E1, E2 by a wall of the outer stator Se which surrounds rotor R and/or due to the suction effect of the suction chamber CA (in this case communication channels are provided also in this area of the inner stator Si).

As soon as the material contained in each helical channel E1, E2 comes to be at the discharging position, it is discharged on the moving web W, flowing through the longitudinal slot 102 of wall 101. This discharging action is preferably favoured by the blowing action due to the blowing chamber CS, even if this measure is not absolutely essential (as the provision of the suction chamber CA).

As already indicated in the foregoing, the configuration of the drum rotor R and in particular the configuration and the arrangement of the helical channels, E1, E2, etc. and the speed of rotation of the rotor R are such that the portion of each channel which is adjacent to the web W moves progressively in the conveying direction A of web W at the same speed as the web, thus being always facing a respective gap G between two adjacent filter segments. In other words, the portion of the helical channel which discharges material on the web W tracks a respective gap G in its movement along direction A. Therefore, filling of each gap G can be performed during the time necessary for said gap to move in the A direction from one end to the other of the drum rotor R. This represents the main advantage of the present invention, from which the possibility derives of insuring a complete and reliable discharge of the material with no need of posing limits to the maximum conveying speed of web W.

Figure 5:
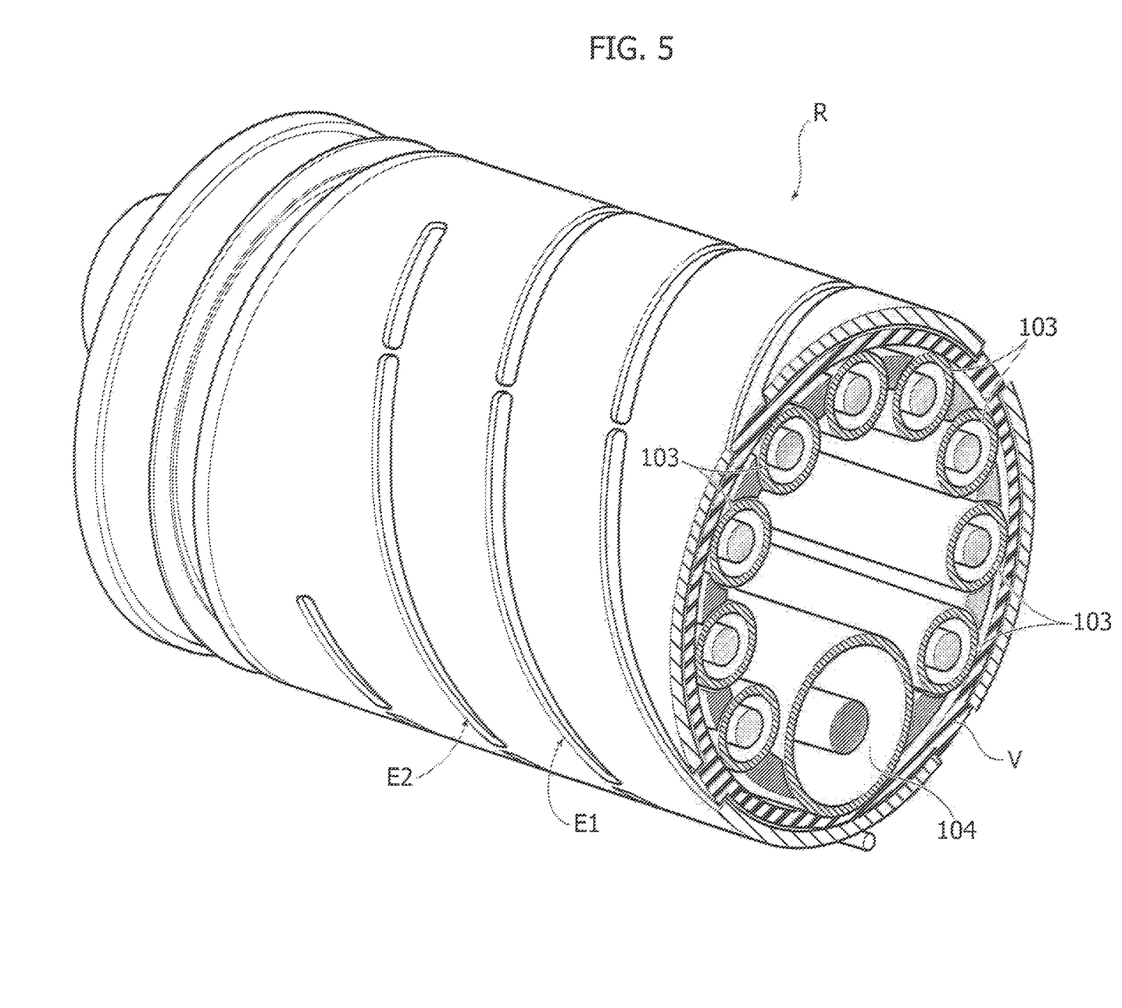
FIG. 5 is a perspective view partially in cross-section of the drum rotor forming part of the device according to the invention, according to an alternative embodiment.

In an alternative embodiment, in order to favour the material discharging step, one or more helical channels are provided, each having a movable or deformable bottom wall. In this case, the inner stator is provided on one side adjacent to the discharging area of the material with a device for pushing said movable or deformable wall radially outwardly, in order to push the material contained within the helical channel out of the channel and over the substrate. In an actual embodiment of this solution, which is diagrammatically shown in FIG. 5, the helical channels E1, E2 are defined by helical slots formed through the tubular wall of the drum rotor R. The bottom wall of the channels is defined by an inner covering tube V forming part of the drum rotor R, constituted of an elastically deformable material (such as rubber). As shown in FIG. 5, the inner stator of the drum rotor R comprises a number of guiding rollers 103, freely rotatable around their respective axes, for guiding and supporting the inner surface of the rubber tube V during rotation of rotor R. The inner stator further carries a main roller 104 whose axis 104a and whose diameter are determined in such a way that the roller 104 applies an outward radial force on the portion of the wall of the rubber tube V which comes to be interposed between roller 104 and the inner surface of the rotor. Therefore, at the discharging area, the bottom of each helical channel is moved radially outwardly so as to push the material contained within the channel out of the channel and on the web W which moves below the rotor R. In the specific example shown in FIG. 5, the rubber tube V has a helical rib at each helical channel of rotor R. This rib occupies the respective channel only for a portion of the thickness of the channel, so as to define the bottom wall of the channel. In a further alternative embodiment, the helical path provided on the drum rotor is constituted by a helical rib carrying adhesive material to be applied on a substrate. In this solution, the device according to the invention is used for depositing the adhesive material on the moving substrate.

Figure 6:
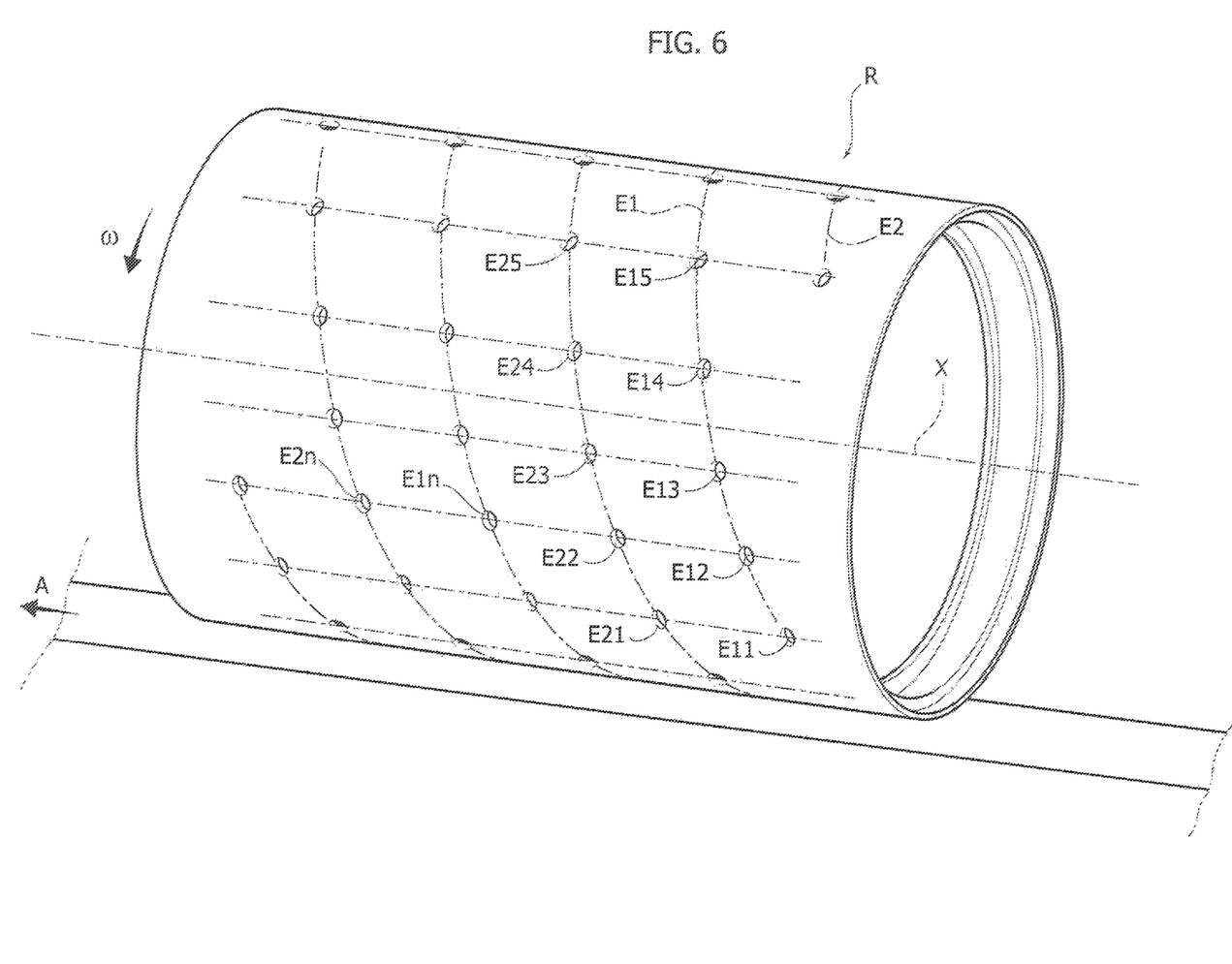
FIG. 6 is a variant of FIG. 3, in which the drum rotor has a plurality of discontinuous helical tracks, each defined by a plurality of cavities distributed along a respective helical path.

FIG. 6 diagrammatically shows a variant of FIG. 3, in which the drum rotor R has a plurality of discontinuous helical tracks E1, E2, etc. . . . each defined by a plurality of cavities E11, E12, E13, etc. . . . E21, E22, E23, etc. . . . distributed along a respective helical path.

Figure 7:
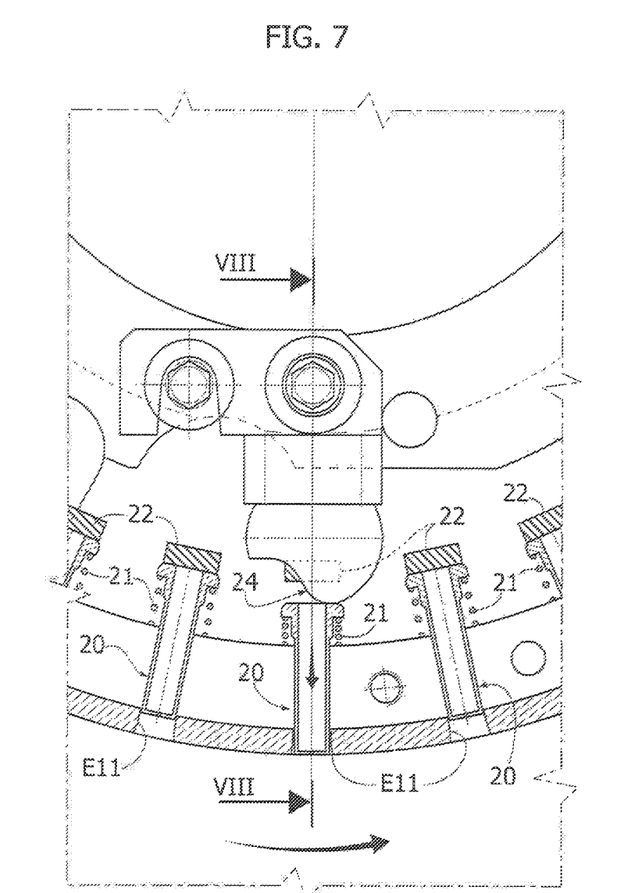
FIG. 7 shows a detail in cross-section of the solution of FIG. 6, in a plane orthogonal to the axis of the drum rotor.
Figure 8:
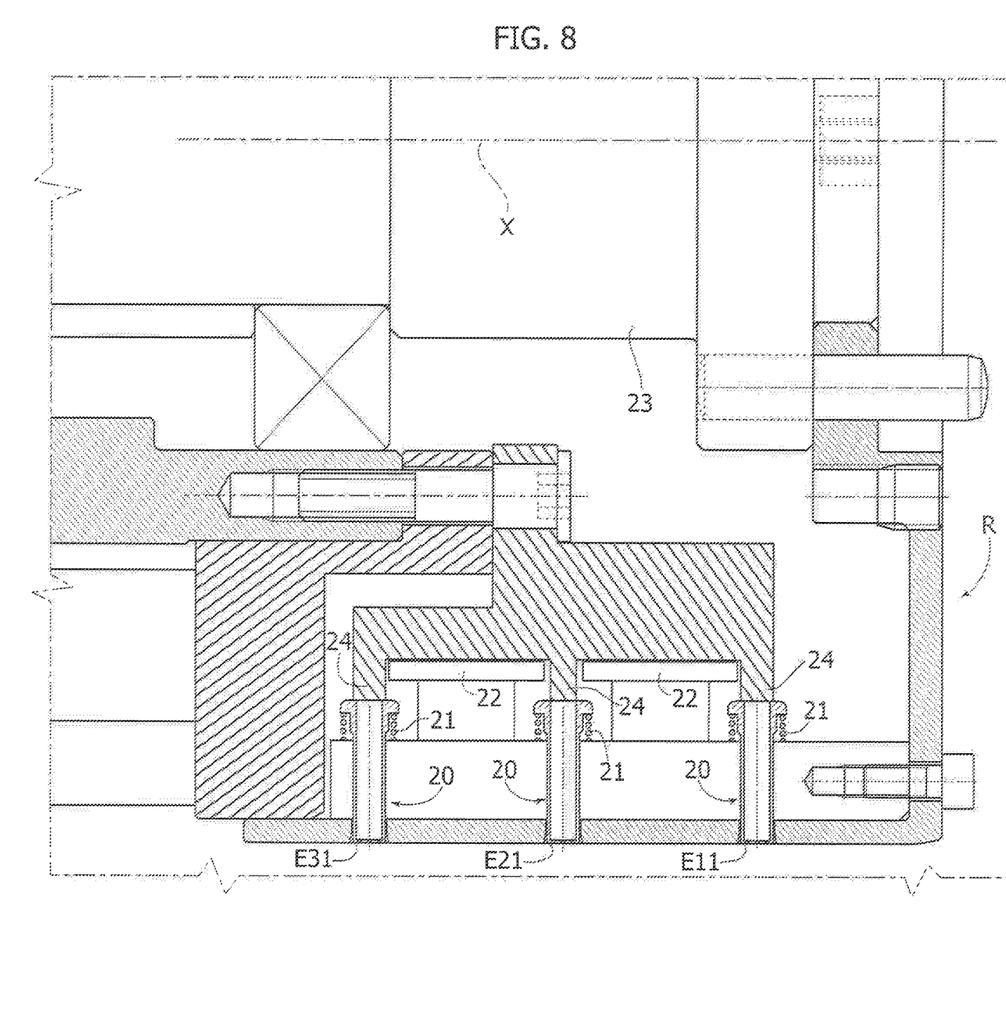
FIG. 8 shows a cross-section according to line VIII-VIII of FIG. 7.

FIGS. 7,8 show an embodiment of the solution of FIG. 6, in which within each cavity Exy there is slidably mounted a piston 20 movable between a retracted position, for receiving particulate material within the cavity and an advanced position, for discharging the particulate material out of the cavity. In the illustrated example, each piston 20 is biased by a spring 21 (FIG. 8) towards its retracted position, against a stop member 22 carried by the structure of the drum rotor R. The fixed structure within which the shaft 23 of rotor R is rotatably mounted carries fixed cams 24 which cause movement of each piston 20 to its advanced position when the cavity in which the piston is mounted comes to be at the lower part of the rotor, in the material discharging area. Alternatively to the use of mechanical means for actuating the movement of pistons 20 within the respective cavities, it is possible to make use of magnetic or electromagnetic means. FIG. 7 shows the different positions taken by a same piston 20 immediately before, during and immediately after discharging the material contained in a respective cavity. In the case of application to a machine for production of filters for cigarettes or smocking articles, in all the embodiments of the invention may be provided that the substrate on which the material is discharged is not constituted by an aligned series of filter segments supported on a moving web, as described with reference to FIG. 3, but rather is constituted by an aligned series of receptacles moving along said conveying direction A, which receive the material from the drum rotor R and discharge the material, at a position located further ahead, on an aligned series of filter segments which are supported on a moving wrapping web.

Naturally, while the principle of the invention remains the same, the details of construction and the embodiments may widely vary with respect to what has been described and illustrated purely by way of example, without departing from the scope of the present invention.

The invention claimed is:

1. Device for discharging particulate material, such as powder material, granules or capsules, or in general free-flowing material, such as adhesive material, on a substrate moving along a conveying direction,
   the device comprising at least one drum rotor having at least one continuous or discontinuous helical track carrying the material to be discharged, and
   said drum rotor being arranged adjacent to the moving substrate with the axis of the drum rotor substantially parallel to said conveying direction, so that the portion of said at least one helical track which is closest to the substrate moves in the conveying direction during rotation of the drum rotor, and discharges the material carried thereby on the substrate.

2. Device according to claim 1, wherein said at least one helical track is defined by at least one helical channel formed in the outer surface of the drum rotor and arranged for receiving particulate material, said channel being continuous or defined by an aligned sequence of channels or cavities of any shape arranged along a same helical path.

3. Device according to claim 1, wherein said drum rotor has a cylindrical wall interposed between an inner stator and an outer stator and at least one material feeding inlet is associated with the outer stator, and at least one suction chamber is associated with the inner stator said suction chamber facing the inner surface of the drum rotor and communicating with a vacuum source, for favouring feeding of the material from said feeding inlet to said at least one helical channel and the wall of said drum rotor has a series of holes at the bottom of said at least one helical channel for passage of air in the direction of said suction chamber.

4. Device according to claim 3, wherein at least one blowing chamber is associated with the inner stator, said blowing chamber facing the inner surface of the drum rotor and being oriented towards said substrate, for favouring discharge of the material on said substrate and the wall of said drum rotor has a series of holes at the bottom of said at least one helical channel for passage of air in the direction of said substrate.

5. Device according to claim 1, further comprising at least one rotating brush for dosing the material within said at least one helical track of the drum rotor.

6. Device according to claim 2, wherein said at least one helical track comprises a helical channel having a movable or deformable bottom wall and within said drum rotor there is provided an inner stator which is provided on one side adjacent to said substrate with a device for pushing said movable or deformable wall radially outwardly, in order to favour discharge of the material on the substrate.

7. Device according to claim 3, wherein the outer stator defines a longitudinal slit or semi-slit or a confining edge between said drum rotor and said substrate.

8. Device according to claim 1, further comprising one or more drum rotors which are axially spaced from each other, each drum rotor comprising one or more helical tracks axially spaced apart from each other.

9. Device according to claim 1, further comprising a plurality of discontinuous helical tracks, each defined by a plurality of cavities distributed along a respective helical path.

10. Device according to claim 9, within each of said cavities there is slidably mounted a piston movable between a retracted position, for receiving the particulate material within the cavity, and an advanced position, for discharging the particulate material out of said cavity.

11. Machine for the manufacture of filters for smoking articles, comprising a device according to claim 1.

12. Machine according to claim 11, wherein said substrate comprises an aligned series of filter segments, which are supported on a wrapping web which moves along said conveying direction.

13. Machine according to claim 11, wherein said substrate comprises an intermediate conveyor having an aligned series of receptacles moving along said conveying direction, which receive the material from the drum rotor and discharge the material, at a position located further ahead, on an aligned series of filter segments which are supported on a moving wrapping web.

14. Method for discharging particulate material, for example powder material, granules or capsules, or in general free-flowing material, such as adhesive material, on a substrate moving along a conveying direction, wherein at least one drum rotor is provided having at least one helical track carrying the material to be discharged, said drum rotor being arranged adjacent to the moving substrate, with the axis of the drum rotor substantially parallel to said conveying direction and said drum rotor rotated in such a way that the portion of said at least one helical track which is closest to the substrate moves in the conveying direction and discharges the material carried thereby on the substrate.

\* \* \* \* \*